(12) United States Patent
Ricard

(10) Patent No.: US 6,731,795 B1
(45) Date of Patent: May 4, 2004

(54) METHOD AND APPARATUS FOR REMOVING DEFECTS FROM DIGITAL IMAGES

(75) Inventor: Gary Ross Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 09/584,294

(22) Filed: May 31, 2000

(51) Int. Cl.7 .................................................. G06K 9/40
(52) U.S. Cl. ........................ 382/167; 382/275; 382/254; 382/274; 375/240.12
(58) Field of Search ................................ 382/272, 190, 382/274, 275, 289, 205, 221, 254, 276, 260, 192, 167; 348/607, 618; 345/581; 375/240.12

(56) References Cited

U.S. PATENT DOCUMENTS

| | | | |
|---|---|---|---|
| 5,751,361 A | 5/1998 | Kim | 348/409 |
| 5,982,946 A | 11/1999 | Murakami | 382/272 |
| 6,055,340 A * | 4/2000 | Nagao | 382/261 |
| 6,173,088 B1 * | 1/2001 | Koh et al. | 382/289 |
| 6,266,054 B1 * | 7/2001 | Lawton et al. | 345/581 |
| 6,424,996 B1 * | 7/2002 | Killcommons et al. | 709/206 |

FOREIGN PATENT DOCUMENTS

GB    2092407 A    8/1982
GB    2308767 A    7/1997

OTHER PUBLICATIONS

Cramer et al, Compiling Java Just in Time, May/Jun. 1997 IEEE Micro, pp. 36–43.

* cited by examiner

Primary Examiner—Timothy M. Johnson
Assistant Examiner—Ali Bayat
(74) Attorney, Agent, or Firm—Roy W. Truelson

(57) ABSTRACT

A relatively long, narrow defect in a digital image is repaired by identifying an elongated area to be repaired, and by automatically calculating pixel color/shade values within the area to be repaired from pixel values in the vicinity of the perimeter of the elongated area. Preferably, a user identifies an elongated rectangular area to be repaired on an interactive display. The computer automatically generates the pixel coordinates of a pair of parallel lines constituting the opposite long sides of the rectangle, and a set of line segments running between the long sides. The interior pixels of the rectangle are then filled by interpolating color values along each line segment. Since this method is not guaranteed to fill all pixels, the system optionally maintains a map of pixels filled and not filled while performing this method, and after completion, performs an additional step of assigning to any unfilled pixels a value based on the average of all adjacent pixels. For long, narrow defects, particularly those introduced by creasing, the automated digital image repair method herein described generally produces images without significant visually noticeable defects, and does so without undue effort on the part of the user.

12 Claims, 6 Drawing Sheets

METHOD AND APPARATUS FOR REMOVING DEFECTS FROM DIGITAL IMAGES

FIELD OF THE INVENTION

The present invention relates to digital data processing devices, and in particular to devices for manipulating digital images.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The declining prices and expanding capabilities of modern computers cause them to be applied to an ever increasing variety of applications. For some years now, inexpensive "personal computers" have been available for personal use at home or for the use of a single individual at a place of business. Although small, these machines provide capability that could have only been imagined not long ago.

Computing power and digital storage being as inexpensive as they are, it has become increasingly popular to create digital records of matter previously embodied in other formats. In particular, it has become popular to create digital records of visual images, such as photographs, drawings, and the like. A digital image comprises a matrix of discrete pixels, each of which may assume any one of a pre-defined set of values representing color or shade. A crude form of digital image is a black-and-white image in which each pixel may assume one of only two values: black or white. However, in most modern systems, black and white digital images usually contain gray-scale pixels, each represented as an integer from, e.g. 0 to 255. Where images are in color, pixel values similarly represent some color or shade of color.

Digital images may be originally created in digital form (e.g., on a computer), but are commonly converted from a non-digital medium to a digital form. Once in digital form, such images may be stored in digital computers, replicated with digital copying devices, edited using any of various editing tools, and transmitted over digital networks, such as the Internet. One common method of conversion to digital form is to scan a photograph, drawing or other image on a non-digital medium (such as paper), using a digital scanning device. Various commercially available digital scanners exist for this purpose. Such scanners may be, e.g., "flatbed" scanners, hand-held scanners, sheet-fed scanners, or of other designs.

When digital images are scanned from other media such as paper, defects in the image may be rendered in the digital format. One very common form of defect is that introduced by a crease in paper media. A crease may remove some of the ink or other coloring along the line of the crease, making it appear as a white or light-colored line on the digital image.

It is possible to repair the effects of a crease in a digitally scanned image by manually editing the image pixel-by-pixel, but this method can be extremely tedious. An unrecognized need exists for an automated method of repairing a digitally scanned image having crease or similar artifacts

SUMMARY OF THE INVENTION

A relatively long, narrow defect in a digital image is repaired by identifying an elongated area to be repaired, and by automatically calculating pixel color/shade values within the area to be repaired from pixel values in the vicinity of the perimeter of the elongated area.

In the preferred embodiment, a user identifies an elongated rectangle enclosing an area to be repaired on the image. The rectangle is preferably identified by first displaying the image on an interactive display of a computer system, by then selecting two points on the interactive display with a pointing device, the two points being opposite corners of the rectangle, and by then rotating, translating and/or resizing the rectangle as necessary to cover the area to be repaired on the image. The computer automatically generates the pixel coordinates of a pair of parallel lines constituting the opposite long sides of the rectangle. Each pixel in one line corresponds to a pixel in the opposite line, each such pair of corresponding pixels defining the endpoints of a line segment perpendicular to the long sides of the rectangle. The interior pixels of the rectangle are then filled by interpolating color values along each line segment from the color values of the endpoints. For simplicity, the phrase "color value" as used herein shall be taken to include such attributes as shade., intensity or brightness in addition to hue, and in the case of black and white images, may include only shade without hue.

Since the method described above is not guaranteed to fill all pixels within the rectangular area, in an alternative embodiment, the computer system maintains a map of pixels filled and not filled while performing the method of the preferred embodiment, and after completion, performs an additional step of assigning to any unfilled pixels a value based on the average of all adjacent pixels.

In another alternative embodiment, a computer system could automatically identify suspect areas to be repaired, and the user could modify the areas and/or confirm repair of the areas.

For long, narrow defects, particularly those introduced by creasing, the automated digital image repair method herein described generally produces images without significant visually noticeable defects, and does so without undue effort on the part of the user.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
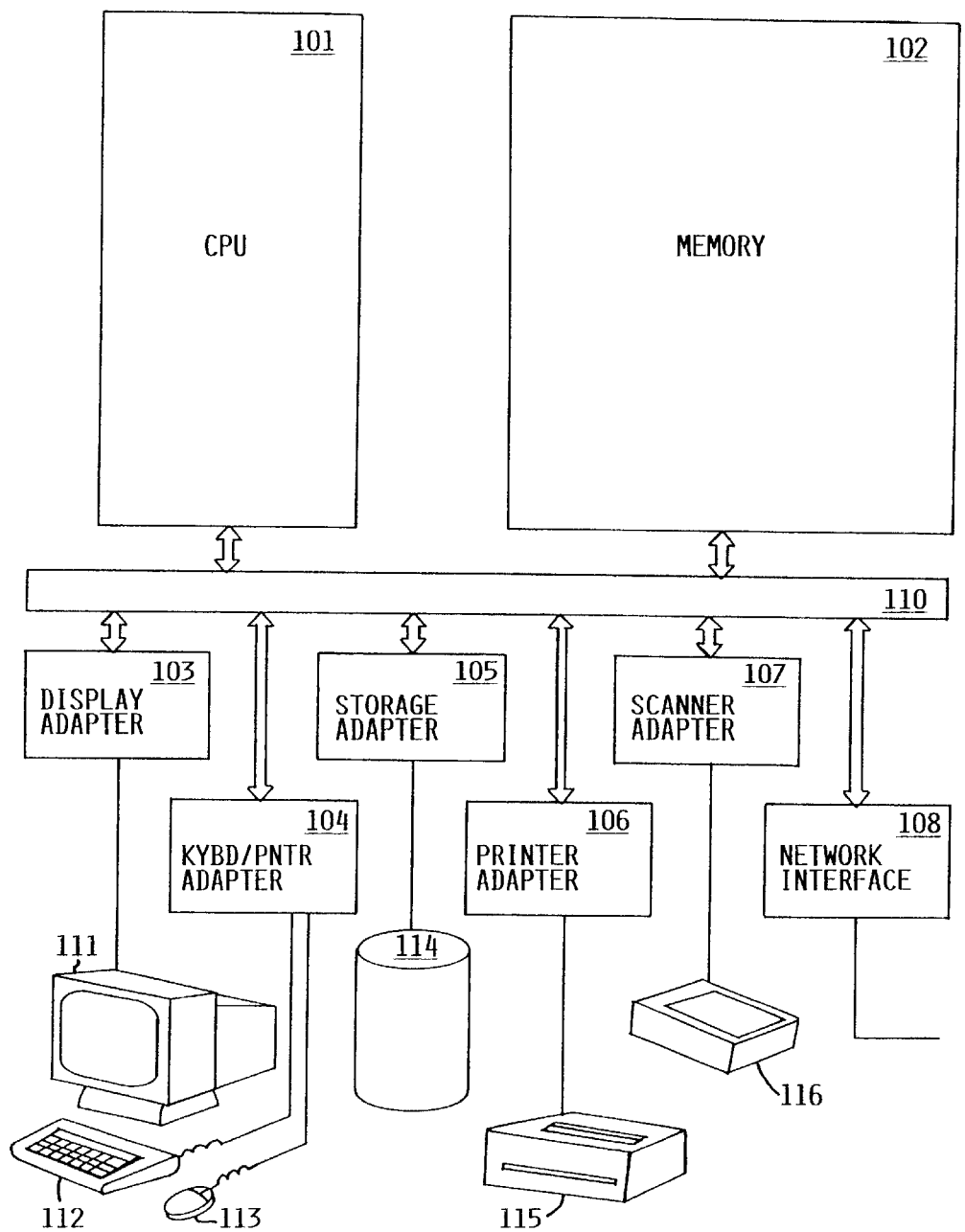
FIG. 1 is a high-level block diagram of an interactive computer system for manipulating digital images, according to the preferred embodiment of the present invention.

Referring to the Drawing, wherein like numbers denote like parts throughout the several views, FIG. 1 is a high-level block diagram of a typical interactive computer system 100, which may be used to receive, store, display, transmit, and/or edit digital images, according to the preferred embodiment. Computer system 100 includes CPU 101, main memory 102, various device adapters and interfaces 103–108, and communications bus 110. CPU 101 is a general-purpose programmable processor, executing instructions stored in memory 102; while a single CPU is shown in FIG. 1, it should be understood that computer systems having multiple CPUs could be used. Memory 102 is a random-access semiconductor memory for storing data and programs; memory is shown conceptually as a single monolithic entity, it being understood that memory is often arranged in a hierarchy of caches and other memory devices. Communications bus 110 supports transfer of data, commands and other information between different devices; while shown in simplified form as a single bus, it may be structured as multiple buses, and may be arranged in a hierarchical form. Display adapter 103 supports video display 111, which is typically a cathode-ray tube display, although other display technologies may be used. Keyboard/pointer adapter 104 supports keyboard 112 and pointing device 113, depicted as a mouse, it being understood that other forms of input devices could be used. Storage adapter 105 supports one or more data storage devices 114, which are typically rotating magnetic hard disk drives, although other data storage devices could be used. Printer adapter 106 supports printer 115. Scanner adapter 107 supports digital scanner 116. Digital scanner 116 scans an image on another medium to create a digital copy of the image, which is digitally stored (e.g., in storage device 114). Digital scanner is preferably a scanner for scanning paper, e.g., a "flatbed" scanner, or a handheld scanner, or a sheet-feed scanner, it being understood that other devices, including devices developed in the future, may be used to scan an image on another medium and create a digital copy. Network interface 108 provides a physical interface to a computer network, such as the Internet, or a local area network. System 100 might alternatively be connected to a larger "mainframe" computer sytem through a mainframe terminal channel interface.

The representation of FIG. 1 is intended as an exemplary simplified representation, it being understood that many variations in system configuration are possible in addition to those mentioned here. The number and type of attached devices may vary considerably. Computer system 100 will typically be any of various models of single-user computer systems known as "personal computers"; however, the methods and apparatus described herein for correcting digital images could be implemented in different environments, and functions could be distributed among different computer systems or system components. For example, multiple interactive workstations could be attached to a mainframe computer system, the mainframe storing data including digital images, and the workstations being used to edit data interactively. Alternatively, the present invention could be implemented using a client-server model in which servers store data or perform certain tasks on behalf of requesting clients. Furthermore, a system for manipulating digital images in accordance with the present invention may be a notebook or laptop computer, a special-purpose device, or any of various hardware variations.

Figure 2:
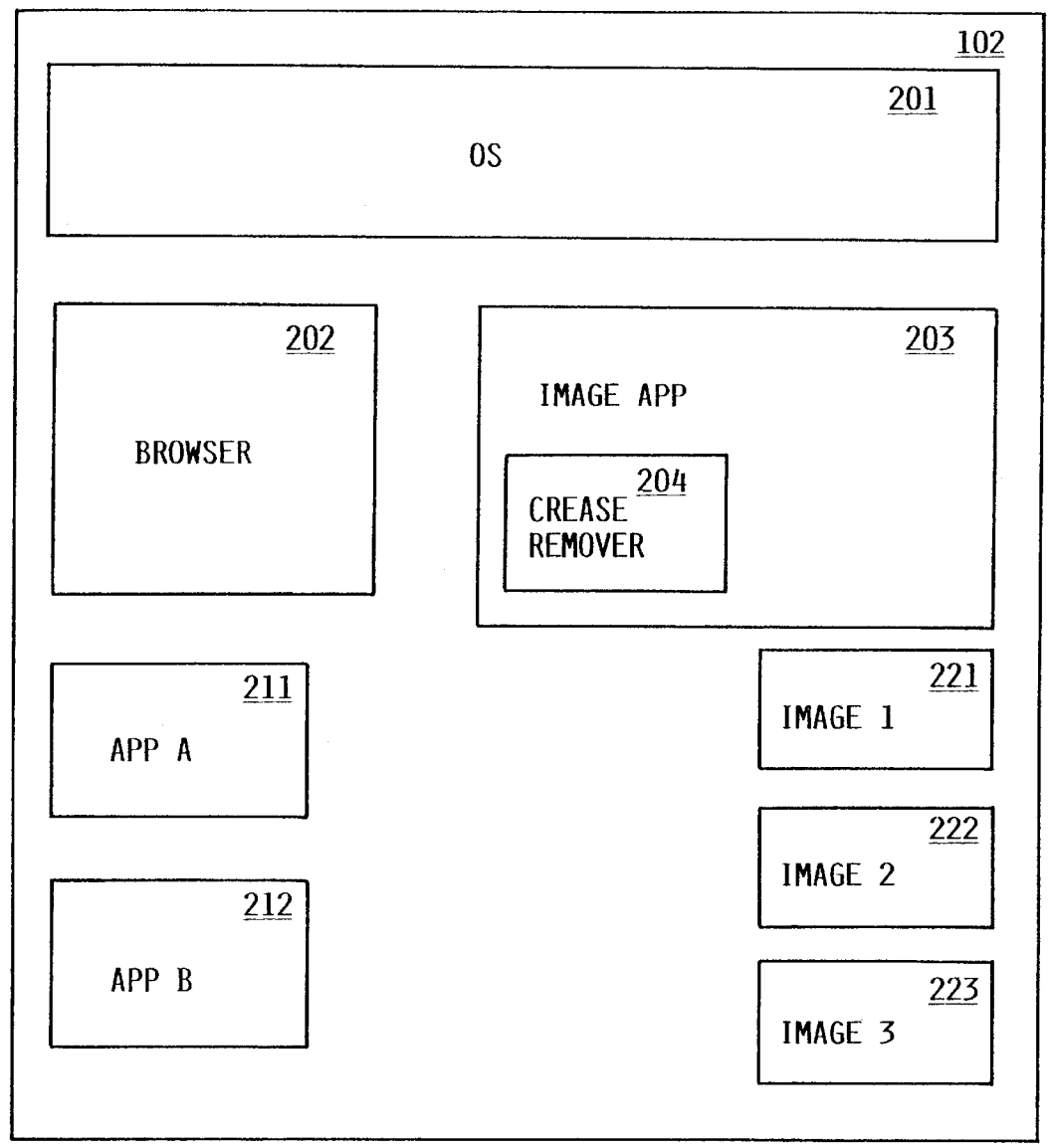
FIG. 2 is a conceptual illustration of the major software components of the computer system, according to the preferred embodiment.

FIG. 2 is a conceptual illustration of the major software components of client workstation system 100 in memory 102. Operating system 201 provides various low-level software functions, such as device interfaces, management of memory pages, management of windowing interfaces, management of multiple tasks, etc. as is well-known in the art. Browser 202 provides a user interface to the Internet, including the ability to send and receive digital image files over the Internet, as is known in the art.. Browser 202 may be integrated into operating system 201, or may be a separate application program. Memory 201 further includes image application 203, which is an application program for manipulating digital images, as described more fully herein. Image files 221–223 are files containing digital images for use by image application 203. Memory 102 may contain various additional applications for performing useful work, which are shown generically in FIG. 2 as applications 211–212. These applications may include, e.g., word processing, spreadsheet, electronic calendar, accounting, graphics, computer code development, or any of thousands of other possible applications.

While a certain number of applications, files or other entities are shown in FIG. 2, it will be understood that these are shown for purposes of illustration only, and that the actual number and type of such entities may vary. Additionally, while the software components of FIG. 2 are shown conceptually as residing in memory, it will be understood that in general the memory of a computer system will be too small to hold all programs and data simultaneously, and that information is typically stored in data storage 114, comprising one or more mass storage devices such as rotating magnetic disk drives, and that the information is paged into memory by the operating system as required.

Preferably, image application 203 includes a scanning function for scanning in an image from scanner 116, a storing function for storing the image on storage device 114, a display function for displaying the image, and an editing function for editing the image. Image application further includes an automated crease removal function 204 for removing certain defects from digital images. Crease removal function 204 may be part of a general editing function, or may be a separate function. Crease removal function 204 fills in pixels in an identified area of an image based on pixels near the perimeter of the area, as described herein.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as storage device 114 and memory 102.

Figure 3A:
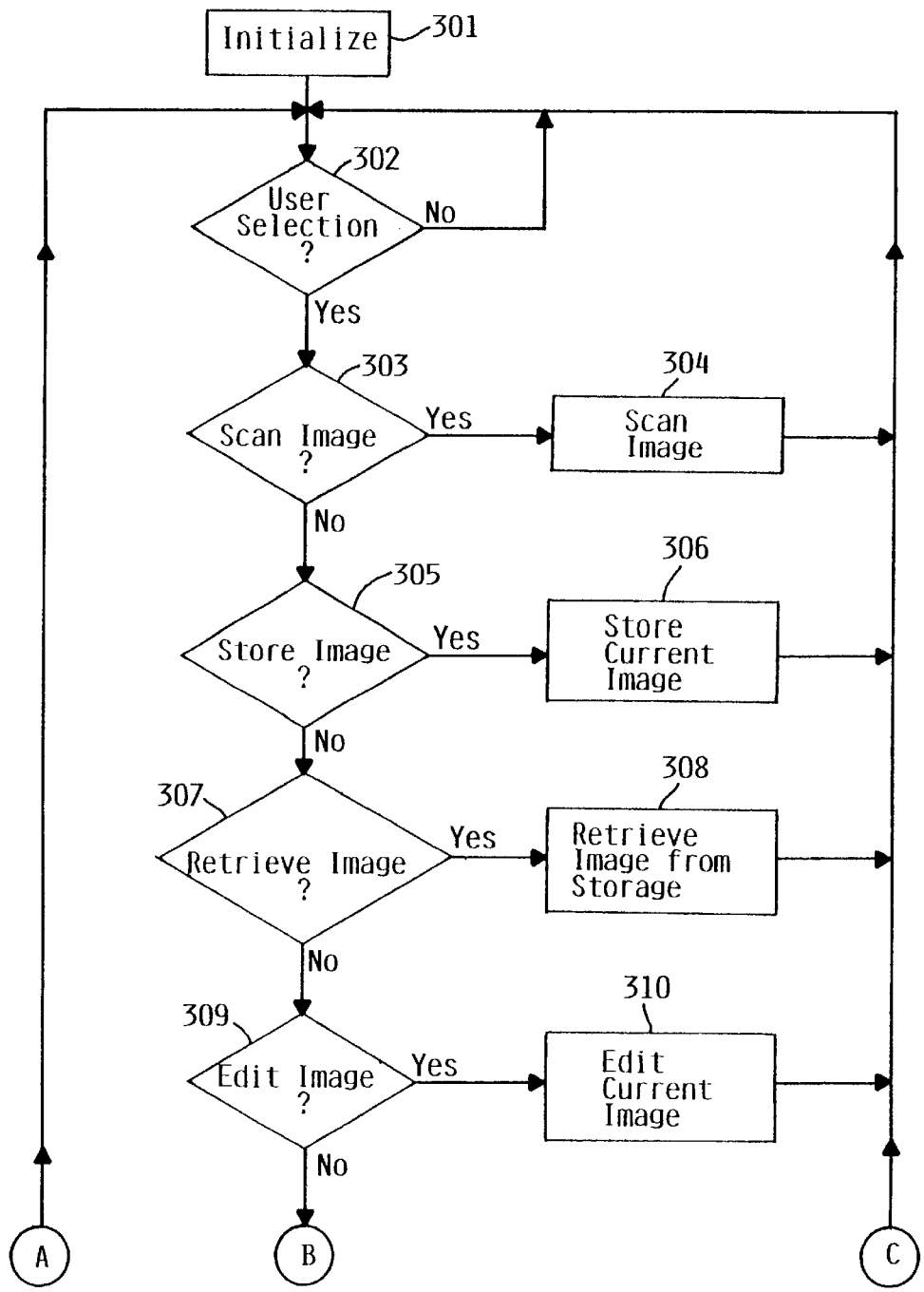
FIG. 3 is a high-level flow diagram of the operation of image application software, according to the preferred embodiment.
Figure 3B:
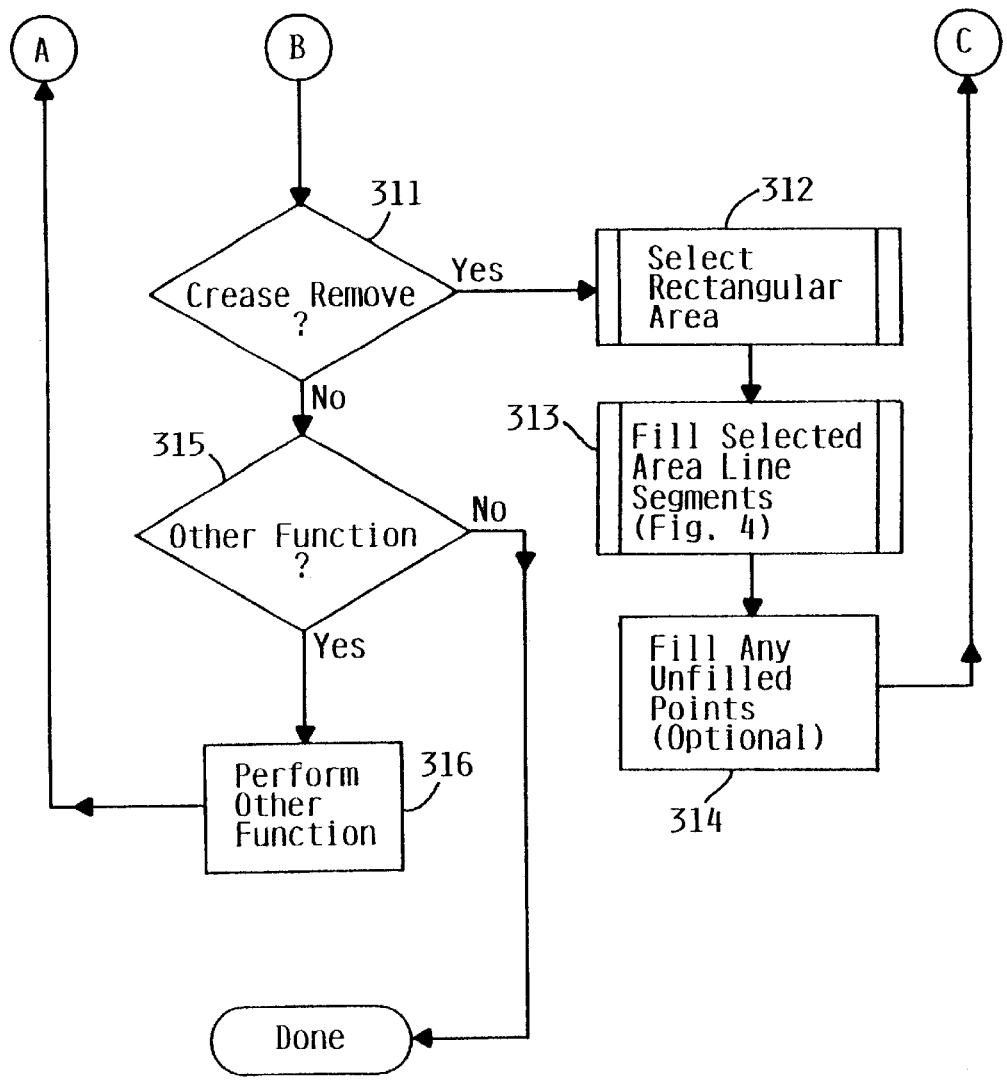

FIG. 3 is a high-level flow diagram of the operation of image application 203, according to the preferred embodiment. Image application 203 is preferably an interactive application program which presents a user with a menu of choices and allows the user to select various functions for using and manipulating digital images. As shown in FIG. 3, upon being invoked by a user, image application 203 initializes (step 301), whereby it presents the user with a main menu of choices, and waits in a loop (at step 302) for the user to make an appropriate selection. Typically, image application would use any of various well-known graphical user interfaces, in which a user makes a selection from a tool bar, menu bar, buttons, list of choices, or the like, by clicking on an appropriate choice with an interactive pointing device, such as a mouse. However, the exact manner of making the choice could vary. When a choice has been made, the "Y" branch from step 302 is taken to perform the appropriate action.

Various actions may be selected by the user, only some of which are shown for illustrative purposes in FIG. 3, it being understood that other actions could be performed. If the user selects a scan action (step 303), the image application will send appropriate commands to an attached digital scanning device 116 to generate a digital image by scanning a document or other object in the scanner's field of view, and to load the image thus generated in memory 102 as a current image, or possibly to store it directly in storage 114 (step 304). If the user select a store image action (step 305), the image application will store a copy of a current image in storage 114 under a filename designated by the user (step 306). IF the user selects a retrieve image action (step 307), the image application prompts the user for a filename and retrieves an image from storage at the designated filename (step 308), the image retrieved becoming a current image for display, editing and the like. If the user selects an edit image action (step 309), the image application displays the image and allows the user to interactively edit it using any of various conventional editing techniques, such as cropping, changing aspect ratio, adding or removing lines or other features, overlaying parts of other images, etc. (step 310). The edit image function preferably allows the user to edit arbitrary pixels of the image by specifying an arbitrary color value.

If none of the above functions is selected, and if the user does not select the crease removal function (the "N" branch from step 311), the user either selects some other function not shown (the "Y" branch from step 315), in which case the image application performs the appropriate selected function (step 316), or exits from the application (the "N" branch from step 315).

The crease removal function 204 is selected by taking the "Y" branch from step 311. It is expected that this function will be most useful in removing defects of the sort introduced by folding a piece of paper so that a permanent crease is made in the paper. Usually, this has the effect of lightening inks or other colorants along the line of the crease. However, while referred to herein as a "crease removal" function, this function is not necessarily limited to the correction of creases. It could be used for other defects which are long and narrow. For example, a cut, a line, or a scanning or transmission artifact may introduce a long and narrow defect which would be amenable to correction using the function described herein.

When the user invokes the crease removal function, the image application preferably displays the current image to be corrected on interactive display 111. If no image has yet been selected as a current image, an interactive menu is presented to retrieve an image from storage and load it into memory 102 as the current image. With the image being displayed, the user interactively identifies a long and narrow rectangular area of the image for defect correction (step 312), as described below.

In the preferred embodiment, the identification of a rectangular area requires the user to identify at least two points on the rectangle. Preferably, these are opposite corners of the rectangle. In the preferred embodiment, the user is prompted to select a first point, in response to which the user moves a pointing device to a desired location on the image and activates a button on the pointing device. The process is then repeated for a second point. Upon selecting both points, the borders of the rectangular area are displayed on display 111, overlayed on the image.

In a strict mathematical sense, two points are not sufficient to define a rectangle. In the preferred embodiment, the sides of the rectangle are initially given a horizontal and vertical orientation, i.e, each side is either strictly horizontal (0 degrees) or vertical (90 degrees), and thus two points are sufficient to define the initial rectangle. However, for purposes of repairing the image, it is desirable to allow rectangles of any arbitrary orientation, i.e. the sides of the rectangle may be oriented at any arbitrary angle, so long as opposite sides are parallel. Therefore, after the user selects the two opposite corners of the rectangle as described above, and the computer system displays an outline of the rectangle in response to the selection, the user may adjust the size, placement and orientation of the rectangle using any of various conventional graphics mechanisms, e.g., the user may translate the rectangle by selecting and dragging the interior with a pointing device; the user may rotate the rectangle by selecting and dragging a corner; the user may change the length of a pair of sides by selecting and dragging an adjacent side, or the user may use any of various alternative interactive graphics input mechanisms.

The rectangular area should ideally be sufficiently long and wide to enclose all the defective pixels, but no larger. Where there are multiple creases or other defects in a paper, such that the affected area makes one or more distinct bends, it is acceptable to subdivide the defective area into multiple relatively straight portions, and separately identify a different rectangular area for each portion, performing the fill steps herein described to correct the defects in each area separately.

The crease removal function presents the user with a "Fill" button. After the user has identified a rectangular area for defect correction and is satisfied with the outline of it, the user will select the "Fill" button to proceed with automatic filling of pixels within the rectangle. This process is represented as step 313 in FIG. 3, and is shown in greater detail in FIG. 4.

Figure 4:
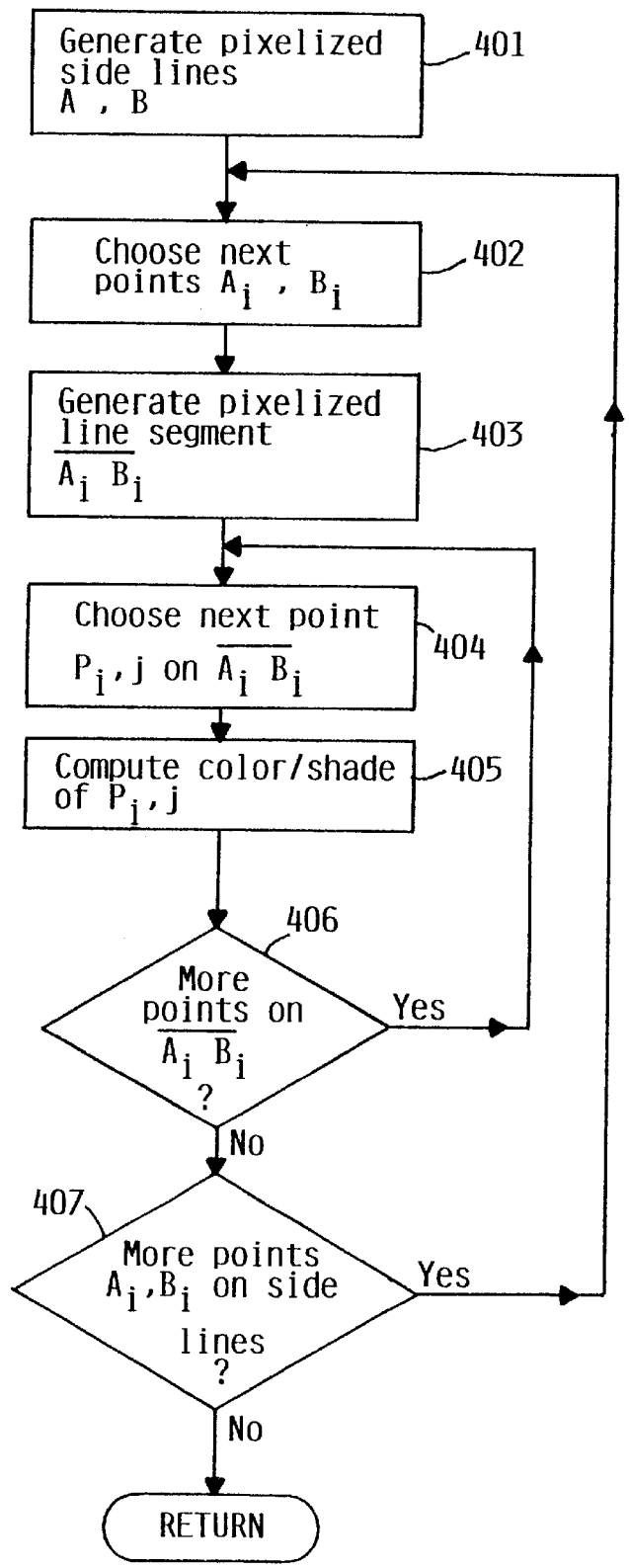
FIG. 4 illustrates in greater detail the steps performed by the crease removal function in filling pixels within a selected rectangular area, according to the preferred embodiment.

FIG. 4 illustrates in greater detail the steps performed by the crease removal function in filling pixels within a selected rectangular area. "Filling" means that pixels within the rectangular area are selected, and a new color value is assigned to each pixel, overwriting the previous value for the pixel. Since the pixel is within an area identified by the user as defective, the previous value of the pixel is considered unreliable, and is not used in determining the new, or "filled", value. The new value is essentially derived by interpolating the values of a pair of corresponding pixels on opposite sides of the rectangular area.

Figure 5:
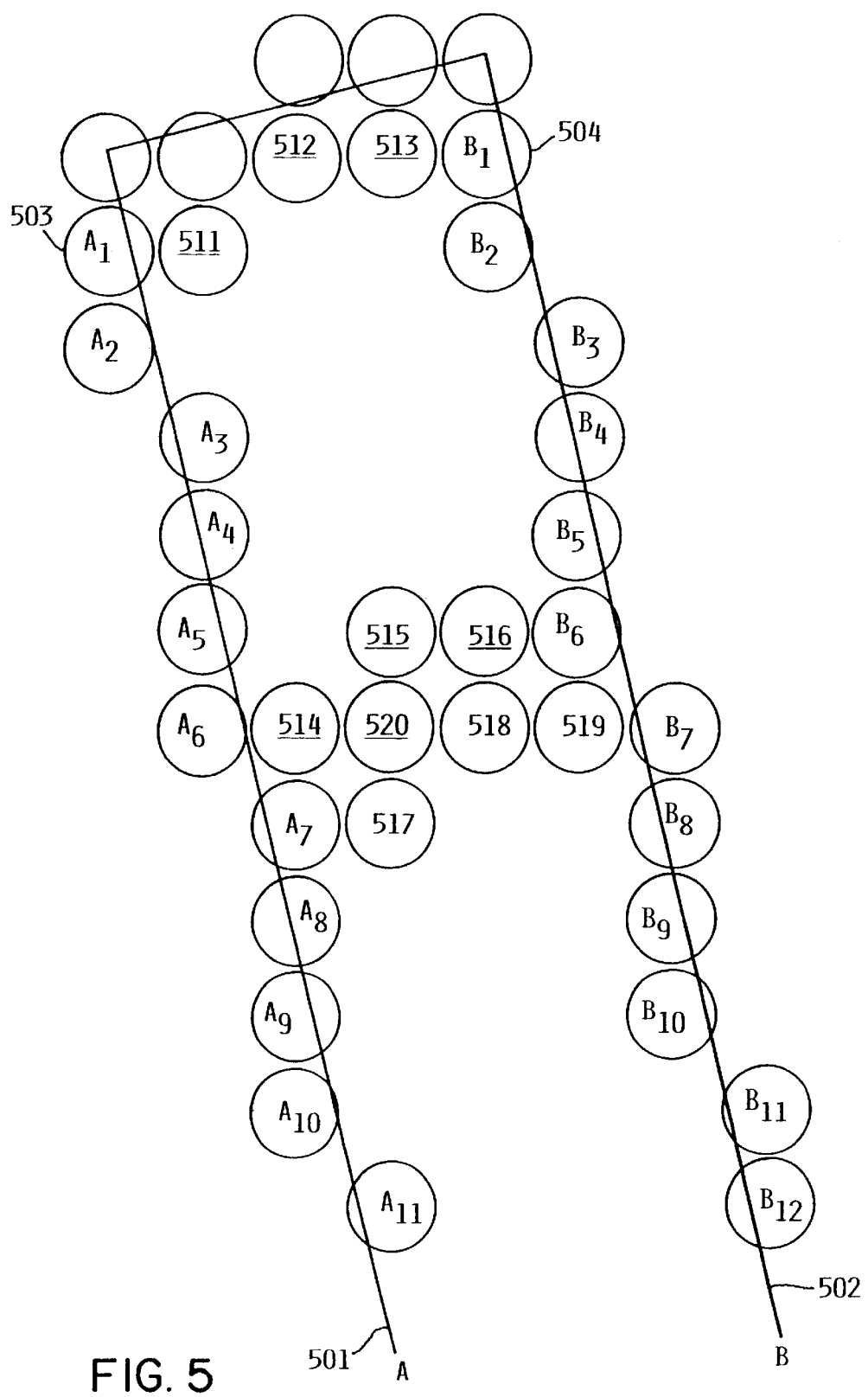
FIG. 5 illustrates a simple example of a portion of a user-selected pixelized rectangular area which is filled to correct an image defect, in accordance with the algorithm of the preferred embodiment.

FIG. 5 illustrates a simple example of a portion of a user-selected pixelized rectangular area which is filled in accordance with the algorithm of the preferred embodiment to correct image defects within the area. The circles within FIG. 5 represent individual pixels, it being understood that only some pixels are shown for clarity, although it will be observed that the pixels are arranged in a matrix of rows and columns. Typically, the selected area is much longer in one dimension than the other, the long dimension being referred to as the length of the rectangular area, the short dimension as its width. Line A 501 and Line B 502 represent opposite long sides of the rectangle, only a portion of these sides being shown.

Referring now to FIGS. 4 and 5, the operation of the filling algorithm will be described with reference to the simple example. After a user has identified the corners of a rectangular area to be filled as represented by step 312 and described above, crease removal function 204 automatically causes a pixelized representation of the long sides of the selected rectangular area to be generated (step 401). This pixelized representation may be generated, e.g., by calling an operating system function or other external graphics function, or may be generated by code entirely internal to the crease removal function. The side lines are designated A and B, shown as features 501 and 502 in the example of FIG. 5. Because a digital image consists of discrete pixels, lines A and B are represented not as mathematically pure lines, but as respective arrays of pixels, $A_i$ and $B_i$, as shown in FIG. 5.

The crease removal function then chooses the next pair of corresponding pixels, $A_i$ and $B_i$ (step 402). I.e., on the first iteration through the loop comprising steps 402–407, it chooses pixels $A_1$ 503 and $B_1$ 504, and increments the index variable i by one on each iteration through the loop. This pair of pixels will be the endpoints of a line segment to be filled.

The crease removal function then generates a pixelized representation of the line segment $\overline{A_iB_i}$, which may be done using external called functions or internal code or combinations thereof (step 403). Referring to the example of FIG. 5, on the first iteration through the loop comprising steps 402–407, pixels 511, 512 and 513 are identified as the components of line segment $\overline{A_1B_1}$ at step 403. On the sixth iteration through the loop, pixels 514–516 are identified as the components of line segment $\overline{A_6B_6}$, and on the seventh iteration through the loop, pixels 517–519 are identified as the components of line segment $\overline{A_7B_7}$.

At steps 404–406, each pixel within the line segment $\overline{A_iB_i}$ (not including the two endpoint pixels $A_i$ and $B_i$) is in turn assigned a new color value. Specifically, a pixel $P_{ij}$ is chosen, starting with the pixel nearest pixel $A_i$ (step 404). In the case of line segment $\overline{A_6B_6}$, for example, pixel 514 is first chosen. A new color value is then computed for pixel $P_{ij}$ as explained below, and this new color value replaces the old color value (step 405). If any more pixels remain in line segment $\overline{A_iB_i}$ (step 406), the process repeats until all pixels in line segment $\overline{A_iB_i}$ have been processed. At that point, the "N" branch is taken from step 406. If there are additional line segments $\overline{A_iB_i}$ to be processed (step 407), the crease removal function returns to step 402 to iterate once more through the loop. When all line segments $\overline{A_iB_i}$ have been processed (the "N" branch from step 407), the crease remover returns, having completed the process represented by step 313 of FIG. 3.

At step 405, color value is preferably computed by linear interpolation. Where the image is black and white, each pixel typically contains a single integer value, the integer representing a degree of darkness. E.g., an integer value of 0 through 255 may be used, where 0 represents white and 255 represents completely dark or black, with values in between representing shades of gray. In this case, the new shade value of pixel $P_{ij}$, is preferably defined as the interpolated value between the two endpoints $A_i$ and $B_i$, i.e.:

$$S(Pi,j)=S(Ai)+(S(Bi)-S(Ai))*Dist(Ai,Pi,j)/Dist(Ai,Bi)$$

where S(X) is the shade of pixel X, and Dist(X,Y) is a measure of the distance between pixels X and Y. The distance measure need not be precise, and may be an integer approximation obtained by counting the number of points in the line segment $\overline{A_iB_i}$. For example, in the case of line segment $\overline{A_6B_6}$, it would be acceptable to approximate the distance between pixels $A_6$ and 514 as 1, between $A_6$ and 515 as 2, between $A_6$ and 516 as 3, and between $A_6$ and $B_6$ as 4, in order to simplify the calculations. Other approximations may also be used. On the other hand, it would also be acceptable to calculate precise distances.

Where the image is in color, it is common to represent a color and shade characteristic of a pixel as three integers, R, G and B, representing the red, green and blue color intensity, respectively. Preferably, these are separately interpolated between the endpoints in exactly the same manner as a single shade integer is in the case of a black and white image, i.e.:

$$R(Pi,j)=R(Ai)+(R(Bi)-R(Ai))*Dist(Ai,Pi,j)/Dist(Ai,Bi)$$

$$G(Pi,j)=G(Ai)+(G(Bi)-G(Ai))*Dist(Ai,Pi,j)/Dist(Ai,Bi)$$

$$B(Pi,j)=B(Ai)+(B(Bi)-B(Ai))*Dist(Ai,Pi,j)/Dist(Ai,Bi)$$

Where other color value encoding schemes are used, an analogous appropriate interpolation formula could be derived.

Upon return from the fill procedure explained above and depicted in FIG. 4, the crease removal function optionally performs additional fill, as represented by step 314. It will be observed that the fill procedure described above is not mathematically guaranteed to fill every pixel. Because segments are computed between endpoints on the perimeter of the selected rectangle, and the rectangle may lie at an angle with respect to the grid of pixels, occasional isolated pixels may be left unfilled. In the example of FIG. 5, pixel 520 is contained in neither line segment $\overline{A_6B_6}$ nor line segment $\overline{A_7B_7}$, but is left unfilled in a gap between the two line segments. Therefore, in an alternative variation of the preferred embodiment, crease removal function creates a bit map of the rectangular area when this area is first identified at step 312, and initializes the bit map to all zeroes. When a pixel is chosen at step 404, the bit map value is changed to a one. Then, at step, 314, the crease removal function simply scans the bit map for any pixels which still have a value of zero. For any such pixels, a new color value is computed. While there are various ways in which to compute this new value, in the preferred embodiment, the average color value of the adjacent pixels is used. If the image is a color image, a separate average is taken for each of the red, green and blue intensity values from the adjacent pixels. In the example of FIG. 5, the average value of pixels 514, 515, 517, 518 could be computed and would become the new value of pixel 520.

While various specific formulae for computing the color value of pixels assumed to be degraded have been disclosed above, it will be appreciated by those skilled in the art that many variations in the detailed formulae are possible. For example, averages of multiple points other than the two endpoints of a line segment could be taken. Additionally, it would be possible to identify points on the perimeter having similar color/shade characteristics, and attempt to connect them with line segments having the same characteristics, even if the line segments are not perpendicular to the long edges of the rectangular area. Finally, the area need not necessarily be strictly rectangular, although it should be relatively long and narrow. A rectangle is preferably used because it is easy to identify.

In the preferred embodiment, a defect correction function (referred to as a crease removal function) is part of a larger image application which also has the capability to scan images, transmit images, edit images and so forth. However, these additional capabilities of the image application are merely typical capabilities that such an application might have, and are not necessary for practicing the present invention. Furthermore, the present invention might be implemented as a stand-alone function apart from an image application, or might be a function incorporated in a different type of software product or module, such as a browser, an operating system, a communications manager, etc.

In the preferred embodiment, the user manually identifies a rectangular area in the image to be repaired, preferably by specifying corner points, and then adjusting the size, location or orientation of the rectangular area as needed. However, the area to be repaired could be identified in other ways. For example, the user may draw a line (which may or may not be straight) with a pointing device, the area having an assumed or user-specified width. Furthermore, it may be possible to devise algorithms for automatically detecting suspect areas in digital images and repairing them, without user intervention.

In a further alternative, a machine-executed algorithm for automatically detecting suspect areas in digital images could be used in conjunction with user input to identify an elongated area to be repaired, as follows. The system would scan the image for suspect areas. A suspect area is one satisfying several criteria, e.g.: (a) there is a large difference in color (particularly intensity) between pixels in the suspect area and neighboring pixels: (b) the area is relatively long and narrow, and (c) pixels in the suspect area are nearly all the same. Having identified such a suspect area, the system would then display an outline such as a rectangle over the suspect area, and ask the user to confirm whether the suspect area should be repaired using the techniques described herein. The user would then select an appropriate choice, such as a button, on the interactive display to either confirm or cancel repair of the suspect area. The user could also be give the option of modifying the suspect area before it is repaired, since in some cases the edges of a suspect area may be difficult for an algorithmic system to identify. Since a purely automatic repair process may occasionally remove features from an image which were, in fact, intended to be part of the image, the alternative described herein is deemed preferable to the purely automatic image repair.

Although a specific embodiment of the invention has been disclosed along with certain alternatives, it will be recognized by those skilled in the art that additional variations in form and detail may be made within the scope of the following claims:

What is claimed is:

1. A method for repairing a defective digital image, comprising the steps of:

identifying an elongated rectangular area of said digital image to be repaired, said elongated rectangular area containing a plurality of first pixels, each first pixel having a respective existing color value, said elongated rectangular area having an arbitrary orientation with respect to horizontal and vertical axes of said digital image;

automatically calculating a plurality of new values of said first pixels from color values of a plurality of second pixels, said second pixels being near the perimeter of said elongated area, by identifying a plurality of pixelized line segments, said pixelized line segments being parallel to each other and perpendicular to the long sides of said elongated rectangular area for any arbitrary orientation of said elongated rectangular area and calculating new color values of said first pixels in said pixelized line segments; and replacing said existing color values of said first pixels with said plurality of new color values of said first pixels automatically calculated by said automatically calculating step.

2. The method for repairing a defective digital image of claim 1, wherein said step of calculating new color values of pixels in said pixelized line segments comprises interpolating between color values of the endpoints of said pixelized line segments.

3. The method for repairing a defective digital image of claim 1, wherein said step of identifying an elongated area comprises manually selecting an elongated area on an interactive display of a computer system.

4. The method for repairing a defective digital image of claim 3, wherein said step of manually selecting an elongated area comprises selecting opposite corners of a rectangular area with a pointing device.

5. The method for repairing a defective digital image of claim 1, wherein said step of identifying an elongated area comprises automatically identifying a suspect area from at least one predefined criterion.

6. The method for repairing a defective digital image of claim 5, wherein said step of identifying an elongated area further comprises:

displaying said suspect area on an interactive display;

modifying said suspect area responsive to user input; and receiving user confirmation to repair said suspect area.

7. A method for repairing a defective digital image comprising the steps of:

identifying an elongated area of said digital image to be repaired, said elongated area containing a plurality of first pixels, each first pixel having a respective existing color value;

automatically calculating a plurality of new values of said first pixels from color values of a plurality of second pixels, said second pixels being near the perimeter of said elongated area; and replacing said existing color values of said first pixels with said plurality of new color values of said first pixels automatically calculated by said automatically calculating step;

wherein said elongated area is a rectangle, and said step of automatically calculating a plurality of new color values of said first pixels comprises; (a) identifying a plurality of pixelized line segments, said pixelized line segments being parallel to each other and perpendicular to the long sides of said rectangle; and (b) calculating new color values of pixels in said pixelized line segments; and wherein said step of automatically calculating a plurality of new color values of said first pixels further comprises: (a) maintaining a record of pixels for which new color values are calculated by said step of calculating new color values of pixels in said pixelized line segments; (b) identifying pixels within said elongated area for which new color values are not calculated by said step of calculating new color values of pixels in said pixelized line segments; and (c) calculating new color values for pixels identified by said step of identifying pixels within said elongated area for which new color values are not calculated by said step of calculating new color values of pixels in said pixelized line segments.

8. A computer program product for repairing defective digital images, said computer program product comprising:

a plurality of processor executable instructions recorded on signal-bearing media, wherein said instructions, when executed by at least one processor, cause the computer to perform the steps of:

automatically identifying a suspect elongated area of said digital image as a candidate to be repaired using at least one pre-defined suspect area identifying criterion, said suspect elongated area containing a plurality of first pixels, each first pixel having a respective existing color value;

displaying said automatically identified suspect area to a user on an interactive display;

modifying said suspect area responsive to user input;

receiving user confirmation to automatically repair said suspect area;

responsive to receiving said user confirmation, automatically calculating a plurality of new values of said first pixels from color values of a plurality of second pixels, said second pixels being near the perimeter of said elongated area; and responsive to receiving said user confirmation, replacing said existing color values of said first pixels with said plurality of new color values of said first pixels automatically calculated by said automatically calculating step.

9. The computer program product for repairing a defective digital image of claim 8, wherein said elongated area is a rectangle, and said step of automatically calculating a plurality of new color values of said first pixels comprises:

identifying a plurality of pixelized line segments, said pixelized line segments being parallel to each other and perpendicular to the long sides of said rectangle; and calculating new color values of pixels in said pixelized line segments.

10. The computer program product for repairing a defective digital image of claim 9, wherein said step of calculating new color values of pixels in said pixelized line segments comprises interpolating between color values of the endpoints of said pixelized line segments.

11. A computer program product for repairing defective digital images, said computer program product comprising:

a plurality of processor executable instructions recorded on signal-bearing media, wherein said instructions, when executed by at least one processor, cause the computer to perform the steps of:

identifying an elongated area of said digital image to be repaired, said elongated area containing a plurality of first pixels, each first pixel having a respective existing color value;

automatically calculating a plurality of new values of said first pixels from color values of a plurality of second pixels, said second pixels being near the perimeter of said elongated area; and replacing said existing color values of said first pixels with said plurality of new color values of said first pixels automatically calculated by said automatically calculating step;

wherein said elongated area is a rectangle, and said step of automatically calculating a plurality of new color values of said first pixels comprises: (a) identifying a plurality of pixelized line segments, said pixelized line segments being parallel to each other and perpendicular to the long sides of said rectangle; and (b) calculating new color values of pixels in said pixelized line segment; and wherein said step of automatically calculating a plurality of new color values of said first pixels further comprises: (a) maintaining a record of pixels for which new color values are calculated by said step of calculating new color values of pixels in said pixelized line segments; (b) identifying pixels within said elongated area for which new color values are not calculated by said step of calculating new color values of pixels in said pixelized line segments; and (c) calculating new color values for pixels identified by said step of identifying pixels within said elongated area for which new color values are not calculated by said step of calculating new color values of pixels in said pixelized line segments.

12. The computer program product for repairing a defective digital image of claim 8, wherein said computer program product further includes:

a function for receiving digitally scanned images from a digital scanning device;

a function for editing digital images; and a function for storing digital images.

\* \* \* \* \*